United States Patent
Khalid et al.

(10) Patent No.: US 10,798,121 B1
(45) Date of Patent: Oct. 6, 2020

(54) INTELLIGENT CONTEXT AWARE USER INTERACTION FOR MALWARE DETECTION

(71) Applicant: FireEye, Inc., Milpitas, CA (US)

(72) Inventors: Yasir Khalid, Fremont, CA (US); Sushant Paithane, Sunnyvale, CA (US); Sai Vashisht, Union City, CA (US)

(73) Assignee: FireEye, Inc., Milpitas, CA (US)

( * ) Notice: Subject to any disclaimer, the term of this patent is extended or adjusted under 35 U.S.C. 154(b) by 137 days.

(21) Appl. No.: 15/831,311

(22) Filed: Dec. 4, 2017

Related U.S. Application Data

(63) Continuation of application No. 14/586,233, filed on Dec. 30, 2014, now Pat. No. 9,838,417.

(51) Int. Cl.
  *H04L 29/06* (2006.01)
  *G06F 9/455* (2018.01)

(52) U.S. Cl.
  CPC ........ *H04L 63/145* (2013.01); *G06F 9/45533* (2013.01)

(58) Field of Classification Search
  CPC .......................... H04L 63/145; G06F 9/45533
  See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,278,901 A | 1/1994 | Shieh et al. | |
| 5,319,776 A | 6/1994 | Hile et al. | |
| 5,440,723 A | 8/1995 | Arnold et al. | |
| 5,452,442 A | 9/1995 | Kephart | |
| 5,490,249 A | 2/1996 | Miller | |
| 5,657,473 A | 8/1997 | Killean et al. | |
| 5,802,277 A | 9/1998 | Cowland | |
| 5,842,002 A | 11/1998 | Schnurer et al. | |
| 5,889,973 A | 3/1999 | Moyer | |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Network Security: NetDetector—Network Intrusion Forensic System (NIFS) Whitepaper", ("NetDetector Whitepaper"), (2003).

(Continued)

*Primary Examiner* — Christopher A Revak
(74) *Attorney, Agent, or Firm* — Rutan & Tucker, LLP

(57) ABSTRACT

According to one embodiment, a malware detection system is integrated with at least a static analysis engine and a dynamic analysis engine. The static analysis engine is configured to automatically determine an object type of a received object. The dynamic analysis engine is configured to automatically launch the object after selecting an action profile based on the object type. The dynamic analysis engine is further configured to, provide simulated user interaction to the object based on the selected action profile either in response to detecting a request for human interaction or as a result of a lapse of time since a previous simulated human interaction was provided.

32 Claims, 7 Drawing Sheets

(56) References Cited

U.S. PATENT DOCUMENTS

| | | |
|---|---|---|
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,088,804 A | 7/2000 | Hill et al. |
| 6,092,194 A | 7/2000 | Touboul |
| 6,094,677 A | 7/2000 | Capek et al. |
| 6,108,799 A | 8/2000 | Boulay et al. |
| 6,118,382 A | 9/2000 | Hibbs et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,237,008 B1 | 6/2007 | Tarbotton et al. |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,325,251 B1 | 1/2008 | Szor |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,693,947 B2 | 4/2010 | Judge et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,743,419 B1 | 6/2010 | Mashevsky et al. |
| 7,779,463 B2 | 8/2010 | Stolfo et al. |
| 7,784,097 B1 | 8/2010 | Stolfo et al. |
| 7,818,800 B1 | 10/2010 | Lemley, III et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,072 B2 | 6/2012 | Matulic |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,198 B2 | 10/2012 | Mott et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,240 B2 | 11/2012 | Lorsch |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |

(56) References Cited

U.S. PATENT DOCUMENTS

| | | |
|---|---|---|
| 8,381,299 B2 | 2/2013 | Stolfo et al. |
| 8,402,529 B1 | 3/2013 | Green et al. |
| 8,464,340 B2 | 6/2013 | Ahn et al. |
| 8,468,604 B2 | 6/2013 | Claudatos et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,695,097 B1 | 4/2014 | Mathes et al. |
| 8,707,437 B1 | 4/2014 | Ming-Chang et al. |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,769,692 B1 | 7/2014 | Muttik et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,869,144 B2 | 10/2014 | Pratt et al. |
| 8,879,558 B1 | 11/2014 | Rijsman |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,959,428 B2 | 2/2015 | Majidian |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,009,834 B1 | 4/2015 | Ren et al. |
| 9,015,814 B1 | 4/2015 | Zakorzhevsky et al. |
| 9,027,135 B1 | 5/2015 | Aziz |
| 9,071,638 B1 | 6/2015 | Aziz et al. |
| 9,092,625 B1 * | 7/2015 | Kashyap ............... G06F 21/566 |
| 9,104,814 B1 | 8/2015 | Mompoint et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,165,142 B1 | 10/2015 | Sanders et al. |
| 9,171,157 B2 | 10/2015 | Flores et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,210,185 B1 | 12/2015 | Pinney Wood et al. |
| 9,223,972 B1 | 12/2015 | Vincent et al. |
| 9,225,695 B1 | 12/2015 | Riera et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,246 B1 | 5/2016 | Wan et al. |
| 9,355,247 B1 | 5/2016 | Thioux et al. |
| 9,356,941 B1 | 5/2016 | Kislyuk et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,773,240 B1 | 9/2017 | McCauley |
| 9,781,144 B1 | 10/2017 | Otvagin et al. |
| 9,787,700 B1 | 10/2017 | Amin et al. |

(56) References Cited

U.S. PATENT DOCUMENTS

| | | |
|---|---|---|
| 9,787,706 B1 | 10/2017 | Otvagin et al. |
| 9,792,196 B1 | 10/2017 | Ismael et al. |
| 9,804,948 B2 * | 10/2017 | Kolberg .............. G06F 9/45558 |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,860 B1 * | 3/2018 | Banga .................... G06F 9/445 |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,265,627 B2 * | 4/2019 | Ghanchi ............... A63F 13/212 |
| 10,366,231 B1 | 7/2019 | Singh et al. |
| 10,454,953 B1 | 10/2019 | Amin et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0054068 A1 | 5/2002 | Ellis et al. |
| 2002/0056103 A1 | 5/2002 | Gong |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0051168 A1 | 3/2003 | King et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083372 A1 | 4/2004 | Williamson et al. |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0111632 A1 | 6/2004 | Halperin |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0199569 A1 | 10/2004 | Kalkunte et al. |
| 2004/0199792 A1 | 10/2004 | Tan et al. |
| 2004/0205374 A1 | 10/2004 | Poletto et al. |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0261030 A1 | 12/2004 | Nazzal |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0022018 A1 | 1/2005 | Szor |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |

(56) References Cited

U.S. PATENT DOCUMENTS

| | | |
|---|---|---|
| 2006/0047665 A1 | 3/2006 | Neil |
| 2006/0064721 A1 | 3/2006 | Del Val et al. |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0129382 A1 | 6/2006 | Anand et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber |
| 2006/0179147 A1 | 8/2006 | Tran et al. |
| 2006/0184632 A1 | 8/2006 | Marino et al. |
| 2006/0190561 A1 | 8/2006 | Conboy et al. |
| 2006/0191010 A1 | 8/2006 | Benjamin |
| 2006/0200863 A1 | 9/2006 | Ray et al. |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0253906 A1 | 11/2006 | Rubin et al. |
| 2006/0288415 A1 | 12/2006 | Wong |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0169195 A1 | 7/2007 | Anand et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240215 A1 | 10/2007 | Flores et al. |
| 2007/0240217 A1 | 10/2007 | Tuvell et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0163356 A1 | 7/2008 | Won-Jip et al. |
| 2008/0181227 A1 | 7/2008 | Todd |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313734 A1 | 12/2008 | Rozenberg et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013405 A1 | 1/2009 | Schipka |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0064335 A1 | 3/2009 | Sinn et al. |
| 2009/0076791 A1* | 3/2009 | Rhoades ............... A63F 13/10 703/21 |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0204514 A1* | 8/2009 | Bhogal ............... G06Q 10/087 705/29 |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271866 A1 | 10/2009 | Liske |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |

(56) References Cited

U.S. PATENT DOCUMENTS

| | | |
|---|---|---|
| 2010/0083376 A1 | 4/2010 | Pereira et al. |
| 2010/0103837 A1 | 4/2010 | Jungck et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192057 A1 | 7/2010 | Majidian |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0275210 A1 | 10/2010 | Phillips et al. |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0287613 A1 | 11/2010 | Singh et al. |
| 2010/0299754 A1 | 11/2010 | Amit et al. |
| 2010/0306173 A1 | 12/2010 | Frank |
| 2010/0306825 A1 | 12/2010 | Spivack |
| 2010/0332593 A1 | 12/2010 | Barash et al. |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0113427 A1 | 5/2011 | Dotan |
| 2011/0126232 A1 | 5/2011 | Lee et al. |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173178 A1 | 7/2011 | Conboy et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0302656 A1 | 12/2011 | El-Moussa |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2011/0320816 A1 | 12/2011 | Yao et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0151587 A1 | 6/2012 | Wang et al. |
| 2012/0167219 A1 | 6/2012 | Zaitsev et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0284710 A1 | 11/2012 | Vinberg |
| 2012/0297489 A1 | 11/2012 | Dequevy |
| 2012/0304244 A1 | 11/2012 | Xie et al. |
| 2012/0317641 A1 | 12/2012 | Coskun et al. |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0247187 A1 | 9/2013 | Hsiao et al. |
| 2013/0263260 A1 | 10/2013 | Mahaffey et al. |
| 2013/0291109 A1 | 10/2013 | Staniford et al. |
| 2013/0298192 A1 | 11/2013 | Kumar et al. |
| 2013/0298243 A1 | 11/2013 | Kumar et al. |
| 2013/0305369 A1 | 11/2013 | Karta et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0333046 A1 | 12/2013 | Sambamurthy |
| 2014/0019963 A1 | 1/2014 | Deng et al. |
| 2014/0026217 A1 | 1/2014 | Saxena et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0096184 A1 | 4/2014 | Zaitsev |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0181975 A1 | 6/2014 | Spernow et al. |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0258384 A1 | 9/2014 | Spikes et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0317735 A1 | 10/2014 | Kolbitsch et al. |
| 2014/0325344 A1 | 10/2014 | Bourke et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0026810 A1 | 1/2015 | Friedrichs et al. |

(56) References Cited

U.S. PATENT DOCUMENTS

| | | | |
|---|---|---|---|
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0121526 A1 | 4/2015 | McLarnon et al. |
| 2015/0180886 A1 | 6/2015 | Staniford et al. |
| 2015/0186296 A1 | 7/2015 | Guidry |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0242627 A1 | 8/2015 | Lee et al. |
| 2015/0244732 A1 | 8/2015 | Golshan et al. |
| 2015/0363598 A1 | 12/2015 | Xu et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2016/0357965 A1 | 12/2016 | Prowell et al. |
| 2016/0359880 A1 | 12/2016 | Pang et al. |
| 2017/0083703 A1 | 3/2017 | Abbasi et al. |
| 2017/0295089 A1 | 10/2017 | Saltsidis et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |
| 2018/0357812 A1* | 12/2018 | Church | G06T 15/005 |
| 2019/0066377 A1* | 2/2019 | Schoening | G06T 19/003 |

FOREIGN PATENT DOCUMENTS

| | | |
|---|---|---|
| WO | 0206928 A2 | 1/2002 |
| WO | 0223805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

"Packet", Microsoft Computer Dictionary Microsoft Press, (Mar. 2002), 1 page.
"When Virtual is Better Than Real", IEEEXplore Digital Library, available at, http://ieeexplore.ieee.org/xpl/articleDetails.iso?reload=true&arnumber=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye") (Sep. 2003).
AltaVista Advanced Search Results (subset). "attack vector identifier" Http://www.altavista.com/web/results?ltag=ody&pg=aq&aqmode=aqa=Event+Orchestrator . . . , (Accessed on Sep. 15, 2009).
AltaVista Advanced Search Results (subset). "Event Orchestrator". Http://www.altavista.com/web/results?ltag=ody&pg=aq&aqmode=aqa=Event+Orchesrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlaq Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists,org/honeypots/2003/q2/319 ("Boubalos"), (Jun. 5, 2003).
Bowen, B. M. et al "BotSwindler: Tamper Resistant Injection of Believable Decoys in VM-Based Hosts for Crimeware Detection", in Recent Advances in Intrusion Detection, Springer ISBN: 978-3-642-15511-6 (pp. 118-137) (Sep. 15, 2010).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Cisco "Intrusion Prevention for the Cisco ASA 5500-x Series" Data Sheet (2012).
Cisco, Configuring the Catalyst Switched Port Analyzer (SPAN) ("Cisco"), (1992-2003).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05 Association for Computing Machinery, Inc., Brighton U.K., (Oct. 23-26, 2005).
Crandall, J.R., et al., "Minos:Control Data Attack Prevention Orthogonal to Memory Model", 37th International Symposium on Microarchitecture, Portland, Oregon, (Dec. 2004).
Deutsch, P., ""Zlib compressed data format specification version 3.3" RFC 1950, (1996)".
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hjelmvik, Erik, "Passive Network Security Analysis with NetworkMiner", (IN)SECURE, Issue 18, (Oct. 2008), pp. 1-100.

(56) References Cited

OTHER PUBLICATIONS

Idika et al., A-Survey-of-Malware-Detection-Techniques, Feb. 2, 2007, Department of Computer Science, Purdue University.
IEEE Xplore Digital Library Sear Results (subset) for "detection of unknown computer worms". Http//ieeexplore.ieee.org/searchresult. jsp?SortField=Score&SortOrder=desc&ResultC . . . (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (Dec 2002).
Krasnyansky, Max, et al., Universal TUN/TAP driver, available at https://www.kernel.org/doc/Documentation/networking/tuntap.txt (2002) ("Krasnyansky").
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Liljenstam, Michael, et al., "Simulating Realistic Network Traffic for Worm Warning System Design and Testing", Institute for Security Technology studies, Dartmouth College, ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
Marchette, David J., Computer Intrusion Detection and Network Monitoring: A Statistical ("Marchette"), (2001).
Margolis, P.E., "Random House Webster's 'Computer & Internet Dictionary 3rd Edition", ISBN 0375703519, p. 595 (Dec. 1998).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware"", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
PCT/US2014/043726 filed Jun. 23, 2014 International Search Report and Written Opinion dated Oct. 9, 2014.
PCT/US2015/067082 filed Dec. 21, 2015 International Search Report and Written Opinion dated Feb. 24, 2016.
Peter M. Chen, and Brian D. Noble, "When Virtual Is Better Than Real, Department of Electrical Engineering and Computer Science", University of Michigan ("Chen"), (2001).
Reiner Sailer, Enriquillo Valdez, Trent Jaeger, Roonald Perez, Leendert van Doorn, John Linwood Griffin, Stefan Berger., sHype: Secure Hypervisor Approach to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at: yuba.stanford.edu/~casado/pcap/sectionl.html, (Jan. 6, 2014).
Thomas H. Ptacek, and Timothy N. Newsham , "Insertion, Evasion, and Denial of Service: Eluding Network Intrusion Detection", Secure Networks, ("Ptacek"), (Jan. 1998).
U.S. Appl. No. 11/717,475, filed Mar. 12, 2007 Final Office Action dated Feb. 27, 2013.
U.S. Appl. No. 11/717,475, filed Mar. 12, 2007 Final Office Action dated Nov. 22, 2010.
U.S. Appl. No. 11/717,475, filed Mar. 12, 2007 Non-Final Office Action dated Aug. 28, 2012.
U.S. Appl. No. 11/717,475, filed Mar. 12, 2007 Non-Final Office Action dated May 6, 2010.
U.S. Appl. No. 13/925,688, filed Jun. 24, 2013 Final Office Action dated Jan. 12, 2017.
U.S. Appl. No. 13/925,688, filed Jun. 24, 2013 Final Office Action dated Mar. 11, 2016.
U.S. Appl. No. 13/925,688, filed Jun. 24, 2013 Non-Final Office Action dated Jun. 2, 2015.
U.S. Appl. No. 13/925,688, filed Jun. 24, 2013 Non-Final Office Action dated Sep. 16, 2016.
U.S. Appl. No. 14/059,381, filed Oct. 21, 2013 Non-Final Office Action dated Oct. 29, 2014.
U.S. Appl. No. 14/229,541, filed Mar. 28, 2014 Non-Final Office Action dated Apr. 20, 2016.
U.S. Appl. No. 14/579,896, filed Dec. 22, 2014 Advisory Action dated Aug. 23, 2016.
U.S. Appl. No. 14/579,896, filed Dec. 22, 2014 Final Office Action dated Jul. 6, 2016.
U.S. Appl. No. 14/579,896, filed Dec. 22, 2014 Non-Final Office Action dated Mar. 22, 2016.
U.S. Appl. No. 14/579,896, filed Dec. 22, 2014 Non-Final Office Action dated Oct. 18, 2016.
U.S. Appl. No. 14/579,896, filed Dec. 22, 2014 Notice of Allowance dated Mar. 1, 2017.
U.S. Appl. No. 14/586,233, filed Dec. 30, 2014 Advisory Action dated Jun. 13, 2017.
U.S. Appl. No. 14/586,233, filed Dec. 30, 2014 Final Office Action dated Mar. 9, 2017.
U.S. Appl. No. 14/586,233, filed Dec. 30, 2014 Non-Final Office Action dated Aug. 24, 2016.
U.S. Appl. No. 14/620,060, filed Feb. 11, 2015, Non-Final Office Action dated Apr. 3, 2015.
U.S. Appl. No. 14/675,648, filed Mar. 31, 2015 Notice of Allowance dated Jul. 5, 2016.

(56) References Cited

OTHER PUBLICATIONS

U.S. Appl. No. 15/339,459, filed Oct. 31, 2016 Non-Final Office Action dated Feb. 9, 2017.
U.S. Appl. No. 15/451,243, filed Mar. 6, 2017 Notice of Allowance dated Jul. 26, 2017.
U.S. Pat. No. 8,171,553 filed Apr. 20, 2006, Inter Partes Review Decision dated Jul. 10, 2015.
U.S. Pat. No. 8,291,499 filed Mar. 16, 2012, Inter Partes Review Decision dated Jul. 10, 2015.
Venezia, Paul, "NetDetector Captures Intrusions", InfoWorld Issue 27, ("Venezia"), (Jul. 14, 2003).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Mathew M., "Throttling Virses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., the Effects of Threading, Infection Time, and Multiple-Attacker Collaboration on Malware Propagation, Sep. 2009, IEEE 28th International Symposium on Reliable Distributed Systems, pp. 73-82.
"Mining Specification of Malicious Behavior"—Jha et al, UCSB, Sep. 2007 https://www.cs.ucsb/edu/.about.chris/research/doc/esec07.sub.--mining.pdf-.
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Hiroshi Shinotsuka, Malware Authors Using New Techniques to Evade Automated Threat Analysis Systems, Oct. 26, 2012, http://www.symantec.com/connect/blogs/, pp. 1-4.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Lastline Labs, The Threat of Evasive Malware, Feb. 25, 2013, Lastline Labs, pp. 1-8.
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
U.S. Appl. No. 14/316,716, filed Jun. 26, 2014 Notice of Allowance dated May 4, 2020.
U.S. Appl. No. 16/525,455, filed Jul. 29, 2019 Non-Final Office Action dated May 15, 2020.

* cited by examiner

INTELLIGENT CONTEXT AWARE USER INTERACTION FOR MALWARE DETECTION

CROSS-REFERENCE TO RELATED APPLICATIONS

This application is a continuation of U.S. application Ser. No. 14/586,233 filed Dec. 30, 2014, now U.S. Pat. No. 9,838,417, issued Dec. 5, 2017, the entire contents of which are incorporated by reference herein.

FIELD

Embodiments of the disclosure relate to the field of cyber security. More specifically, one embodiment of the disclosure relates to a system, apparatus and method for detecting malware.

GENERAL BACKGROUND

Over the last decade, malicious software (malware) has become a pervasive problem for Internet users. Often malware exploits vulnerabilities in networked resources. For instance, over the past few years, more and more vulnerabilities are being discovered in software that is loaded onto network devices, such as vulnerabilities within operating systems for example. While some vulnerabilities continue to be addressed through software patches, prior to the release of such software patches, network devices will continue to be targeted for attack by exploits that use malicious computer code. The malware may attempt to acquire sensitive information or adversely influence or attack normal operations of a network device or the entire enterprise network.

Currently, in malware detection systems, one or more virtual machines may be used to process objects, which may include, for example, content from network traffic and/or files retrieved from a storage location, in order to activate, observe, and thereby detect malicious software. However, this processing may require user interaction, for example, in the form of an input initiated by an input device such as a graphical user interface (GUI), mouse, keyboard, keypad or the like. Based on an inability to provide the necessary user input, current malware detection systems may fail to activate the malicious content within the objects. One reason is that sophisticated malware often has a self-defense mechanism, which attempts to detect whether it is running in a virtual environment of a malware detection system rather than the intended environment of a client device under user control. One type of self-defense mechanism involves the malware monitoring whether user input expected by an application is supplied at the appropriate time. If it is not, the malware may simply hibernate (not activate), and thus not present itself for detection by the malware detection system.

Some conventional malware detection systems apply generic, static patterns of simulated input device controls in a virtual run-time environment in the absence of actual human interaction. However, malware creators have been able to identify these patterns. As a result, they have been able to equip their malware to identify such static simulated device controls, and upon detection, cause the malware to refrain from activating the malicious code in order to remain undetected. As a consequence, some conventional malware detection systems may experience unacceptable levels of false negatives or be forced to deploy a multitude of pattern detection schemes that will increase the rate of false positives.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Figure 1:
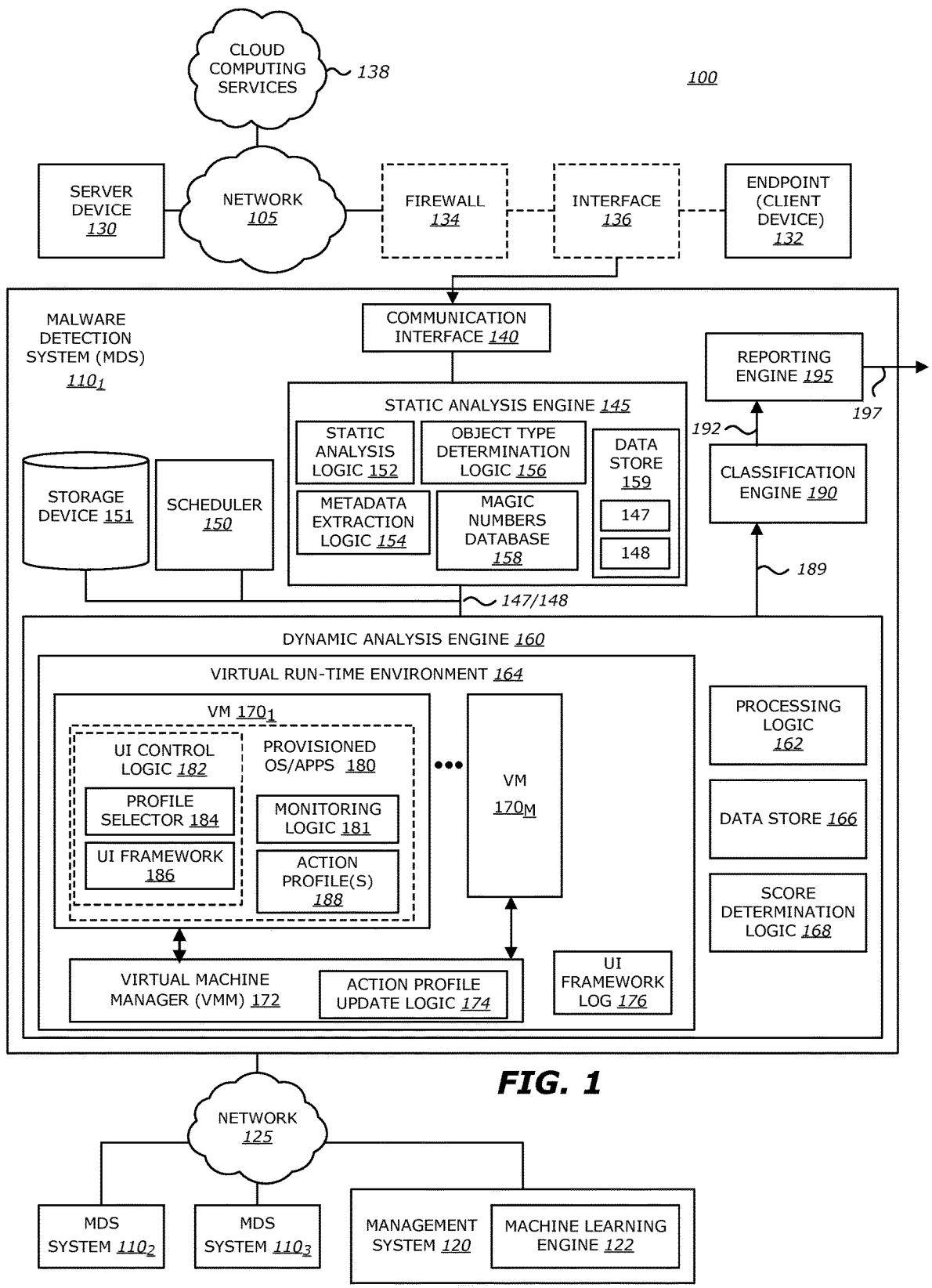
FIG. 1 is an exemplary block diagram of a first embodiment of a malware detection system (MDS) which features user interaction (UI) control logic deployed as part of a virtual run-time environment to provide simulated user interaction to detonate a malicious object.

Various embodiments of the disclosure are directed to a system and method for determining whether or not an object is associated with a malicious attack through, at least, a dynamic analysis of the object within a virtual run-time environment. Herein, the virtual run-time environment features one or more virtual machine instances (VMs), which are provisioned with a guest image associated with a prescribed software profile. The guest image may include a software application in addition to an operating system (OS) along with monitors, namely software components that are configured to observe and capture run-time behavior of an object under analysis during processing within the virtual machine. With this VM configuration, in order to effectively detect a malicious object, the object needs to be "launched" and subsequently "detonated" within the virtual run-time. Herein, the term "launch" (and other tenses) represents performance of one or more events that starts activation of an object under analysis while the phrase "detonate" (and other tenses) represents performance of one or more events that trigger a malicious attack by the activated object. Additionally, the contents of related application, U.S. patent application Ser. No. 13/801,532 filed on Mar. 13, 2013 is incorporated by reference herein.

In some cases, however, objects are detonated only in response to some sort of user interaction (e.g., one or more user inputs responsive to an event actuated by the object or user-initiated inputs during normal use of the object, etc.). According to one embodiment of the disclosure, user interaction (UI) control logic may be deployed as part of the virtual run-time environment in order to provide simulated user interaction needed to detonate certain types of malicious objects within a VM. Embodiments of the invention provide simulated user interaction tailored to the type of object (and, in some embodiments, other features related to the object) being processed in the virtual run-time environment. The UI control logic comprises a plurality of components, including (1) a profile selector and (2) a UI framework, as described herein.

Herein, the UI control logic may feature multiple implementations. For instance, the UI control logic may be provisioned as components of a VM. As an alternative embodiment, the UI framework may be provisioned as a component of the VM, but the profile selector may be deployed as part of a virtual machine monitor (VMM), which may be deployed, according to one embodiment of the disclosure, as part of a "hosted hypervisor" (e.g., software that runs on top of a host operating system) or as an intermediary operation layer between the hardware and the VMs. When deployed as part of the VMM, the profile selector may be adapted to provision the UI framework component within the VM and perhaps multiple UI framework components within multiple VMs.

According to one embodiment of the disclosure, the profile selector selects an action profile from a plurality of action profiles that may be hosted in the VM or outside the VM within the virtual run-time environment. This selection may be based, at least in part, on metadata associated with an object under analysis. Herein, the metadata defines, at least in part, the context for determining the action profile that governs the simulated user interaction. The metadata further determines the software appropriate to launch the object in the run-time environment. Of course, the selection of the action profile also may be based on a type of network device deploying (hosting) the VM (e.g., security appliance that analyzes network traffic, files within a file storage system, etc.) or other information from the static analysis of the object. According to this action profile selection scheme, the dynamic analysis of the object is "context aware".

Herein, the metadata may include data that identifies the type of object under analysis. Of course, it is contemplated that, besides object type, other metadata may be used by the profile selector for selecting the particular action profile. Examples of other metadata that may be used by the profile selector to select a particular action profile for controlling the simulation of user interactions with the object launched in the VM may include, but are not limited or restricted to information related to the following: (i) whether the object is encrypted and/or its type of encryption scheme, (ii) whether the object is an embedded object, (iii) the type of application needed for processing the object, and/or (iv) transmission protocol used in delivery of network content including the object.

Each "action profile" is a collection of instructions and/or commands that performs UI functionality in accordance with a set of rules prescribed for that action profile. As a result, each action profile is configured for use in dynamically controlling UI actions associated with a certain type of object in contrast to the use of patterns per se. For instance, the action profile associated with a Microsoft® Excel® spreadsheet may conduct different UI actions (e.g., select tabs, add text to certain cells, scroll down a certain number of cell rows, etc.) than a PDF document (e.g., scroll pages of the document, etc.) and such actions may be conducted at different times depending on the behavior of the object under analysis.

As described herein, the UI framework comprises (i) the actuation logic, (ii) active UI simulation logic; (iii) passive UI simulation logic; and (iv) device control simulation logic. According to one embodiment of the disclosure, the actuation logic is a software component that is implemented as part of a software profile that provisions the VM and is responsible for launching the object under analysis. The particular implementation of the actuation logic may vary depending on the object type. Upon the actuation logic launching the object, the active UI simulation logic, the passive UI simulation logic and the device control simulation logic are instantiated with or are instantiated to access content within the selected action profile. Operating in accordance with the selected action profile, the simulation logic within the UI framework conducts particular actions (e.g., expected user interface interactions and/or methods of activation) during particular operating states at which such actions are expected if the object was running on a targeted endpoint. These particular actions may be conducted in accordance with a predetermined sequence (order) and/or at (or within) predetermined periods of time. Furthermore, two or more of these particular actions may be conducted concurrently (at least partially overlapping at the same time) or such actions may be performed sequentially.

Operating as part of the UI framework, the active UI simulation logic detects input requests (e.g., password request, opening of a dialog box that requires dismissal prior to continuing, opening of a text box that requires text entry, etc.), which require human interaction that directly responds to the input request. This type of simulated human interaction is referred to herein as "active" simulated human interaction. In response, the active UI simulation logic operates in accordance with the selected action profile to determine whether to provide a response and the type of response, where appropriate.

The passive UI simulation logic operates in accordance with the selected action profile and, in certain cases, provides simulated human interaction in response to a prescribed level of inactivity by the object and/or a prescribed period of time after the suspect object has launched has elapsed. The passive UI simulation logic is in communication with timing circuitry (e.g., real time clock, counter, etc.), where the monitored time plays a factor in determining when to conduct prescribed simulated human interactions that are triggered by a period of inactivity by the object and/or an elapsed time from when the suspect object was launched.

Responsive to detecting a prescribed period of inactivity for example, the passive UI simulation logic simulates user-initiated interactions on the object such as moving to a particular page in a Microsoft® Office Word document (object), switching to a particular tab in a Microsoft® Office Excel document (object), or switching to a different PowerPoint™ slide in accordance with the object-specific action profile. As an example, assuming the object is a Microsoft® Office Excel document, experiential knowledge of typical placement of exploit/malicious code (e.g., through machine learning techniques) in a Microsoft® Office Excel document may result in instructions by the selected action profile for the passive UI simulation logic to simulate human interaction by switching to the second sheet of the Microsoft® Office Excel document at a predetermined time after the actuation logic launches the object.

The device control simulation logic operates in accordance with the selected action profile and provides simulated device controls that are agnostic to object type, which may occur in response to yet another level of prescribed inactivity. For example, the device control simulation logic may receive instructions from the selected action profile to simulate certain device control interactions, such as simulate particular keystrokes and/or particular mouse movements, in an attempt to trigger a malicious attack by the object.

Embodiments of the disclosure may be employed by or take the form of a network device, including a cyber-security appliance that features a malware detection system (MDS). The MDS includes a static analysis engine and a dynamic analysis engine, or, in another embodiment, only a dynamic analysis engine. In some embodiments, the MDS may be implemented as a server or client device or other system (any of which may be referred to as an "endpoint") connectable to a network. The dynamic analysis engine may include a virtual run-time environment that automatically analyzes, without user assistance, objects from the received network traffic and simulates human interaction to detonate and detect malicious objects during virtual processing. The results of the analysis may be reported to network administrators or other personnel for further analysis and action.

I. Terminology

In the following description, certain terminology is used to describe features of the invention. For example, in certain situations, the terms "logic", "component", and "engine" are representative of hardware, firmware and/or software that is configured to perform one or more functions. As hardware, logic (or component or engine) may include circuitry having data processing or storage functionality. Examples of such circuitry may include, but are not limited or restricted to a microprocessor, one or more processors and/or processor cores, a programmable gate array, a microcontroller, an application specific integrated circuit, semiconductor memory, or combinatorial logic.

Logic (or component or engine) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "object" generally refers to a collection of data, whether in transit (e.g., over a network) or at rest (e.g., stored), often having a logical structure or organization that enables it to be classified for purposes of analysis. During analysis, for example, the object may exhibit a set of expected characteristics and, during processing, a set of expected behaviors. The object may also exhibit a set of unexpected characteristics and a set of unexpected behaviors that may evidence the presence of malware and potentially allow the object to be classified as part of a malicious attack.

Examples of objects may include one or more flows or a self-contained element within a flow itself. A "flow" generally refers to related packets that are received, transmitted, or exchanged within a communication session. For convenience, a packet is broadly referred to as a series of bits or bytes having a prescribed format, which may, according to one embodiment, include packets, frames, or cells. Further, an "object" may also refer to collective payloads of a number of related packets, e.g., a single webpage received over a network. Moreover, an object may be a file or document retrieved from a storage location over a transmission medium.

As a self-contained element, the object may be an executable (e.g., an application, program, segment of code, dynamically link library "DLL", etc.) or a non-executable. Examples of non-executables may include a document (e.g., a Portable Document Format "PDF" document, Microsoft® Office® document, Microsoft® Excel® spreadsheet, etc.), an electronic mail (email), downloaded web page, or the like.

The term "transmission medium" may be construed as a physical or logical communication path between two or more network devices (e.g., any devices with data processing and network connectivity such as, for example, a security appliance, a server, a mainframe, a computer such as a desktop or laptop, netbook, tablet, firewall, smart phone, router, switch, bridge, etc.) or between components within a network device. For instance, as a physical communication path, wired and/or wireless interconnects in the form of electrical wiring, optical fiber, cable, bus trace, or a wireless channel using infrared, radio frequency (RF), may be used.

The term "network device" should be construed as any electronic device with the capability of connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, a computer, a security appliance, or the like.

The term "computerized" generally represents that any corresponding operations are conducted by hardware in combination with software and/or firmware. Also, the terms "compare" or "comparison" generally mean determining if a match (e.g., a certain level of correlation) is achieved between two items where one of the items may include a particular signature pattern.

The term "action profile" should be interpreted as a plurality of instructions and/or commands that provision logic to conduct, in accordance with a set of rules prescribed for that particular action profile, different types of simulated user interactions. The simulated user interactions may include "active" simulated human interactions; "passive" simulated human interactions and simulated device control interactions.

An active simulated human interaction includes simulated actions that may be performed by a user in response to an event initiated by a suspect object under analysis. In some situations, the simulated action may be required before any further activities are conducted by the object. Examples of an active simulated human interaction include closing a window or dialog box; selecting a particular radio button; and/or entering characters into a text box).

A passive simulated human interaction includes simulated actions that are normally performed by a user during activation of the object, but such actions are not responsive to a particular behavior by the object. Examples of passive simulated human interaction include scrolling pages of a document (e.g., PDF or Word® document), browser, or other type of displayed image; selecting certain tabs of an Excel® spreadsheet; and/or accessing certain menu options.

A simulated device control interaction includes simulated input from an input device for an endpoint. Examples of a simulated device control interaction include keystrokes, mouse movement or clicks, and/or detected activation of certain area or areas of a touch screen.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for detection, verification and/or prioritization of malware, which may include malicious content, in particular, through providing object-type specific simulated human interaction to an object activated in a virtual run-time environment. As this invention is susceptible to embodiments of many different forms, it is intended that the present disclosure is to be considered as an example of the principles of the invention and not intended to limit the invention to the specific embodiments shown and described.

II. General Architecture of the Malware Detection System

Referring to FIG. 1, an exemplary block diagram of a network 100 deploying a plurality of malware detection systems (MDS) $110_1$-$110_N$ (N>1, where N=3 for this embodiment) communicatively coupled to a management system 120 via a network 125 is shown. In general, the management system 120 is adapted to manage each MDS $110_1$-$110_3$. For instance, the management system 120 may be configured to perform content updates (e.g., upload new rules or modified rules, delete rules, modify parameters that are utilized by the rules and/or upload metadata) within logic operating as part of a communication interface 140, a static analysis engine 145, a dynamic analysis engine 160, a classification engine 190, and/or a reporting engine 195 with an optional user interface capability (e.g., for purposes of initial system set up and configuration). In particular, the management system 120 is configured to propagate updates to one or more action profiles (hereinafter "action profile(s)") via action profile update logic 174. The action profile(s) 188 are used to control the simulation of human interactions with and/or device controls for the object during analysis, as described below.

As shown in FIG. 1, a first malware detection system (MDS) $110_1$ is an electronic device that is adapted to analyze information associated with incoming data (e.g., network traffic, input data over a communication network 105, input data from another type of transmission medium, etc.) from/to one or more endpoints 132. As this illustrative embodiment, the communication network 105 may include a private network such as a wireless data telecommunication network, wide area network, a type of local area network (LAN), or a combination of networks. Other embodiments may include incoming data (files from a file store) being retrieved from a file storage location (e.g., a hard disk drive (HDD) or a flash drive storage) for malware detection. Herein, the first MDS $110_1$ is communicatively coupled with the communication network 105 via an interface 136 and/or an operational firewall 134.

In general, the interface 136 may operate as a data capturing device that is configured to receive at least a portion of network traffic propagating to/from one or more endpoints 132 and provide information associated with the received portion of the network traffic to the first MDS $110_1$. This information may include an object, namely multiple packets collectively forming an executable or a non-executable (e.g., a document embedded within an email message or a web page). Alternatively, although not shown, the interface 136 may be configured to receive files or other objects that are not provided over a network. For instance, as an example, the interface 136 may be a data capturing device that automatically (or on command) accesses data stored in a storage system or another type of interface, such as a port, for receiving objects manually provided via a suitable dedicated communication link or from storage media such as portable flash drives.

In general terms, the interface 136 may be configured to capture data typically directed to the endpoint 132, where the captured data includes at least one object 147 for analysis and its corresponding metadata 148. The metadata 148 may be used, at least in part, to determine protocols, application types and other information that may be subsequently used by logic, such as a scheduler 150 for example, to configure one or more VMs $170_1$-$170_M$ (M≥1) with selected software profiles. For instance, the metadata 148 may be used to determine which software images (e.g., application(s)), if any, in addition to operating systems to be fetched a storage device 151 for configuring operability of the VMs $170_1$-$170_M$ in order to process the subject object 147 at a desired time, for a desired period of time, and/or in a desired order. Additionally, as one feature of the invention, the metadata 148 associated with the suspect object 147 may be used by the profile selector 184, implemented in the VM(s) itself (e.g. VM $170_1$) or in the virtual machine monitor (VMM) 172 as described below, to select which action profile(s) 188 for controlling simulated user interaction with the suspect object 147 in efforts to detonate the suspect object 147 within one or more of the VM $170_1$-$170_M$.

In some embodiments, although not shown, interface 136 may be contained within the first MDS $110_1$. In other embodiments, the interface 136 can be integrated into an intermediary device in the communication path (e.g., a firewall, router, switch or other networked electronic device) or can be a standalone component, such as an appropriate commercially available network tap as shown.

As further shown in FIG. 1, the first MDS $110_1$ comprises the communication interface 140, the static analysis engine 145, the dynamic analysis engine 160, the classification engine 190 and the reporting engine 195. Herein, the communication interface 140 receives an object from the interface 136 and converts that object into a format, as needed or appropriate, on which analysis by the static analysis engine 145 may be conducted. This conversion may involve decompression of the object, decompilation of the object, extraction of specific data associated with the object, and/or emulation of the extracted data (like Javascript™). The communication interface 140, in some embodiments, may be integrated into the interface 136.

Referring still to FIG. 1, the static analysis engine 145 may include one or more controllers (e.g., processing circuitry such as one or more processors) that feature static analysis logic 152, metadata extraction logic 154, and object-type determination logic 156 for accessing magic number database 158 and/or data store 159. The data store 159 may be used to store the analyzed object 147 and/or extracted metadata 148 prior to transmission to the data analysis engine 160 upon determining that the object 147 is "suspicious" and requires further analysis to determine whether that object 147 is associated with a malicious attack.

Referring still to FIG. 1, the static analysis logic 152 includes one or more software modules that, when executed by the controller(s), analyzes characteristics associated with the suspect object 147, which may be a portion of network traffic (or downloaded data) according to this embodiment of the disclosure. Such static analysis may include one or more checks being conducted on the object without its execution. Examples of the checks may include (i) heuristics, which is based on rules or policies as applied to the object 147 and may determine whether one or more portions of the object 147 is associated with anomalous or suspicious characteristics (e.g., a particular URL associated with known exploits, or a particular source or destination address etc.) associated with known exploits; or (ii) determinative rule-based analysis that may include blacklist or whitelist checking.

The metadata extraction logic 154 is responsible for extracting and/or generating metadata 148 contained as part of and/or associated with the suspect object 147. The extraction and/or generation of the metadata 148 may occur after the object 147 is determined by the static analysis logic 152 to feature anomalous or suspicious characteristics. Of course, alternatively, the metadata extraction logic 154 may extract and/or generate the metadata 148 prior to or concurrently with the operations conducted by static analysis logic 152.

The metadata 148 may be identified as being associated with the suspect object 147, and is stored accordingly. Examples of metadata 148 may include, but are not restricted or limited to, information that identifies the type of object 147. For example, a particular document (e.g., Microsoft® Excel spreadsheet) is an example of an object type, which may be in the form of a non-executable. This metadata 148 may be subsequently used by the profile selector 184 to select at least one particular action profile for controlling simulated user interaction conducted during analysis of the object 147 within one or more VMs $170_1$-$170_M$ of the virtual run-time environment 164, as described below.

In addition to, or in lieu of the metadata associated with the source of the object 147, it is contemplated that other metadata may be captured by metadata extraction logic 154. For instance, other metadata which may be used by the profile selector 184 for selecting the particular action profile. This metadata may include, but is not limited or restricted to the following: (i) data identifying whether the object is encrypted and/or its type of encryption scheme, (ii) data identifying whether the object is an embedded object, (iii) data identifying the type of application needed for processing the object, and/or (iv) data identifying the transmission protocol used in delivery of network content including the object. These and potentially other features related to the object are stored for later use.

From the extracted metadata, the object-type determination logic 156 may determine object type. For instance, the object-type determination logic 156 may analyze content within the object 147, which may identify the object type. For instance, as an illustrative example, the object-type determination logic 156 may identify a predetermined number of bytes at the beginning of the object 147 (sometimes referred to as the "magic numbers" for the object) and compare the values associated with these bytes with stored values within the magic number database 158. Upon a successful comparison, the object-type determination logic 156 has identified the object type.

For instance, as an illustrative embodiment, the first few bytes of the object 147 may, in certain cases, be used to determine the object-type or at least infer the object type based on the communication protocol in use. As an example, the object-type determination logic 156 may determine that the object 147 starts with the hexadecimal string value "4D5A" which, upon comparison with entries within the magic number database 158, identifies that the object 147 is an executable. Similar, the object-type determination logic 156 may determine that the object 147 starts with a hexadecimal string value of "25 50 44 46" and, upon comparing this value with stored data within the magic number database 158, determines that the object 147 is a PDF document.

As discussed above, the static analysis engine 145 may route the suspect object 147 along with the metadata 148 (inclusive of any object type information generated by the object-type determination logic 156) to the virtual run-time environment 164 within the dynamic analysis engine 160. The results of the static analysis may be used to establish an order of processing of objects in the virtual run-time environment 164 based on the level of "suspiciousness" of the objects (e.g., as established by a relative suspiciousness score). The static analysis engine 145 may also filter benign objects from further analysis. In one embodiment, if the object 147 does not appear suspicious and/or malicious based on a static analysis, the static analysis engine 145 may simply denote that the object 147 is non-malicious and may refrain from subjecting the object 147 to further analysis. However, upon determining that the object 147 includes characteristics that are suspicious, extracting the metadata 148 associated with the suspect object 147 and determining the object type, the static analysis engine 145 may pass this suspect object 147 along with the metadata 148 to the dynamic analysis engine 160 for more in-depth analysis in a VM-based operating environment. All or portions of the static analysis engine 145 may be integrated into the interface 136 or into other devices, such as a firewall or another network device, such as a network device located at the periphery of a network to be protected so as to capture and examine objects contained in ingress content.

The dynamic analysis engine 160 may include processing logic 162, a virtual run-time environment 164, a data store 166, and/or a score determination logic 168. According to one embodiment, processing logic 162 may be configured to control inter-operability between components within the dynamic analysis engine 160. For instance, the processing logic 162 may control the buffering of the passed objects and their corresponding metadata into the data store 166 and the loading of the objects and corresponding metadata into the VM(s) $170_1$-$170_M$ directly or into the VMM 172 for supply to the VMs $170_1$-$170_M$.

The virtual run-time environment 164 provides for virtual processing of the object 147 through one or more VMs $170_1$-$170_M$ managed by a virtual machine monitor (VMM) 172. The VMM 172 manages reconfiguration of the one or more VMs $170_1$-$170_M$ before conducting the virtual analysis based on externally provided configuration updates, namely software profiles (e.g., OS and/or application instances), action profiles, or the like. As shown, the VMM 172 features action profile update logic 174, which is responsible for updating rules, parameters, instructions, and/or other data maintained by the action profile(s) 188 hosted in VM $170_1$, as shown. Of course, the action profile update logic 174 may update action profile(s) 188 hosted in other VMs (e.g., VM $170_M$) or hosted outside the VM (e.g., within storage device 151, within data store 166, or within storage within the virtual run-time environment (not shown)). For clarity sake, the operations of VM 170₁ are described, although all or some of the other VMs 170_M or VMs 170₂-170_M may operate in a similar manner.

As shown, the VM 170₁ may be provisioned with an operation system (OS) and, dependent on the object type, one or more applications 180, along with the monitoring logic 181 and user interaction (UI) control logic 182. The monitoring logic 181 monitors run-time behaviors of the object 147 when launched in the VM 170₁. The UI control logic 182 provides simulated user interactions to detonate a malicious object that is loaded into the VM 170₁ and requires some sort of user interaction to initiate a malicious attack. According to one embodiment of the disclosure, the UI control logic 182 comprises a plurality of components, which include (1) a profile selector 184 and (2) UI framework 186.

According to one embodiment of the disclosure, the profile selector 184 selects an action profile from the action profile(s) 188 that are shown as being hosted in the VM 170₁. This selection may be based, at least in part, on the metadata 148 associated with the suspect object 147. For example, the metadata 148 may include data produced by the object-type determination logic 156 that identifies an object type for the object 147. As described above, the metadata 148 may include other data that is uncovered during parsing of the object 147 by the static analysis engine 145 (e.g., password protected fields, password in an email message that included the object 147, etc.), which may be relied upon for selecting a particular action profile within the action profile(s) 188.

As further shown in FIG. 3A and FIG. 3B, the UI framework 186 comprises (1) the actuation logic 340 and (2) different types of user interaction (UI) simulation logic 350, where the different UI simulation logic implemented within the UI framework 186 as described below. Herein, the actuation logic 340 is a software component which is implemented as part of the software profile that provisions the VM 170₁ and is responsible for "launching" the suspect object 147. The object may be "launched" by starting a process that starts the object 147 (when the object 147 is an executable or script) or starting a process that manipulates the object 147 (e.g., opens the object 147 using Adobe® Acrobat® Reader application when the object 147 is a PDF document; opens the object 147 using Microsoft® Office® application when the object 147 is an Excel® (.xls) file, etc.).

When launching the object 147, the actuation logic 340 notifies the UI simulation logic 350 of the launched object. In response, logic within the simulation logic 350 is instantiated with or is instantiated to access the selected action profile, which controls the simulated user interaction conducted by the UI framework 186 during analysis of the object 147. The simulated user interaction may include signaling that simulates a particular action during a particular operating state of the object 147 at which such an action is expected if running on a targeted endpoint (client device). These particular actions may be order dependent (sequenced) and/or time dependent (e.g., occur at a particular time, occur at a particular time after a previous action, etc.).

Referring back to FIG. 1, the monitoring logic 181 and UI framework log 176 collectively operate to record, while the object 147 is launched in the VM 170₁, the requests for input by the object 147. The monitoring logic 181 and the UI framework log 176 also monitor and log any "active" simulated human interactions provided to the suspect object 147 in response to the input request, any responses to the simulated human interactions by the suspect object 147, "passive" simulated human interactions that are not responsive to behaviors by the suspect object 147, and/or simulated device control interactions. The data recorded by the UI framework log 176 may be referenced by the score determination logic 168, which determines a probability (score) that is used, at least in part by the classification engine 190, to determine (i) whether the suspect object 147 is associated with a malicious attack and (ii) severity of the malicious attack. The contents of the UI framework log 176 may also provide an ability to correlate, for reporting purposes, malicious objects that are detonated in response to certain type(s) of user interaction.

For instance, when a submitted object 147 is classified as malicious, the UI framework log 176 can provide information for understanding which simulation logic caused or helped a successful detonation. In other words, from data within the UI framework logic 176, a determination can be made as to the efficacy of action profiles and the UI framework. Such feedback can be used to "fine-tune" action profiles. Additionally, by use of data within the UI framework logic, malwares can be classified based on user interaction(s) necessary for detonation. This classification and details of user interaction(s) can augment the Threat Intelligence aspects such as forensic analysis of malwares and incidence response. Similarly, when the object 147 is classified as suspicious, the UI framework logic 176 provides information for understanding the shortcomings in the set of user interactions the UI framework 186 provides (e.g., a new feature might be required in UI framework 186 or new rules or parameters may be needed for the selected action profile). On the other hand, if a user interaction performed by the UI framework obstructs object detonation, it can be rectified in subsequent action profile update.

As shown in FIG. 1, the reporting engine 195 is adapted to receive information from the classification engine 190 via transmission medium 189 and generate alerts (e.g., various types of messages including text messages and email messages, display images, or other types of information over a wired or wireless transmission medium) that identify to a network administrator that the suspect object 147 is associated with a malicious attack and is user-interaction dependent.

Although FIG. 1 illustrates the MDS 110₁ as a dedicated network device and the discussion of FIG. 1 explains examples based on an object received over the network interface 136, the MDS 110₁ may be implemented on an endpoint, such as the client device 132. In such an embodiment, prior to actual execution of the object, the MDS 110₁ may launch the object in a sandboxed environment and conduct simulated user interactions, which may include simulated human interactions and simulated device controls. Responsive to non-anomalous behaviors by the object 147, the endpoint 132 is allowed to utilize the object. In addition, the MDS 110₁ may be implemented in the cloud computing services 138, where the above described simulated human and device control interactions may be fully or partially conducted therein.

Figure 2:
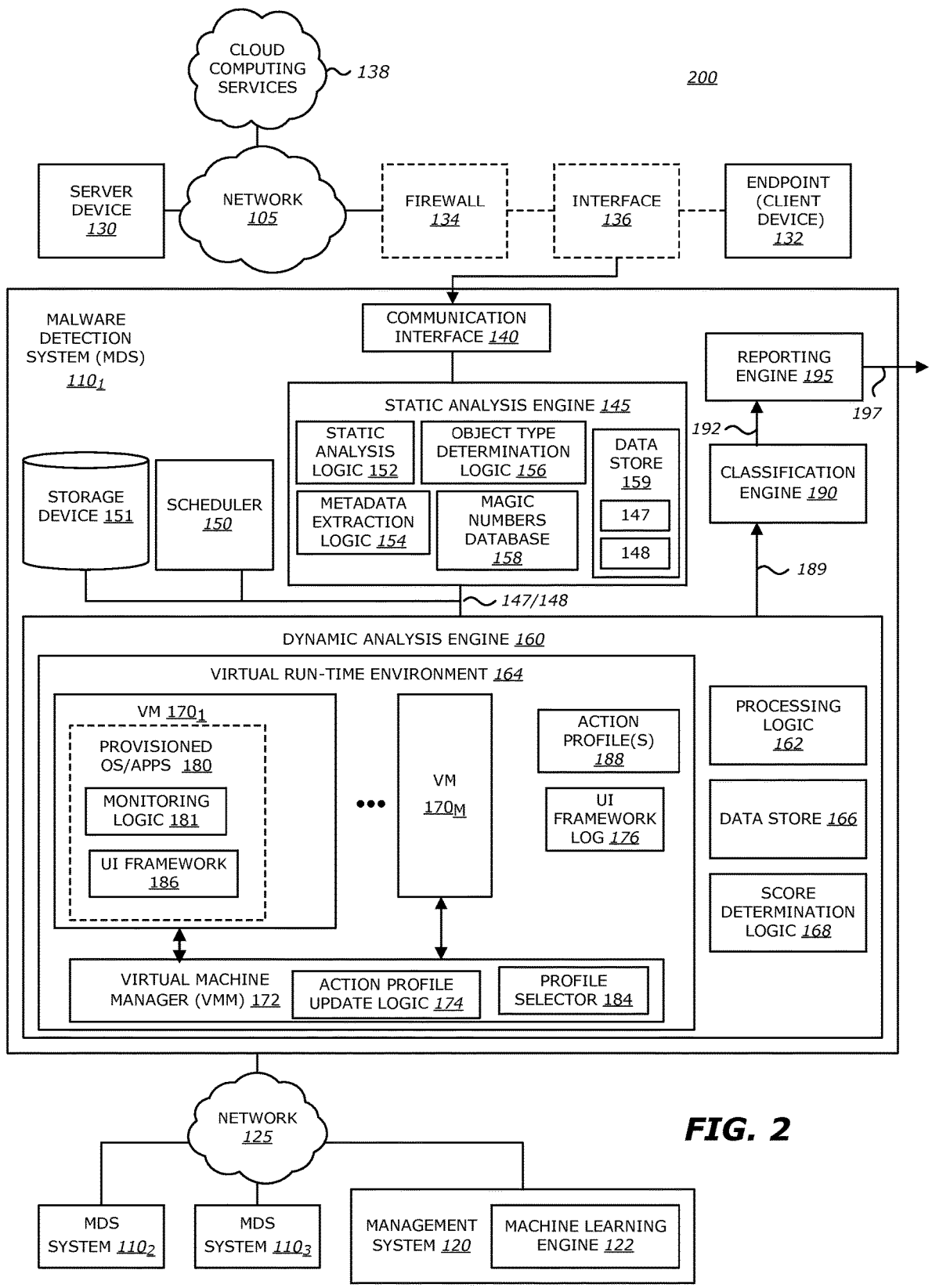
FIG. 2 is an exemplary block diagram of a second embodiment of the MDS which features a second architecture scheme of the UI control logic deployed as part of the virtual run-time environment.

Referring now to FIG. 2, a block diagram of a second embodiment of the MDS 110₁ employed within a network 200 is shown. According to this embodiment of the disclosure, the dynamic analysis engine 160 includes processing logic 162, virtual run-time environment 164, data store 166 and/or score determination logic 168. However, the VM(s) 170₁-170_M are not provisioned with action profile(s) 188 as shown in FIG. 1. Rather, action profile(s) 188 are hosted outside the VM(s) 170₁-170_M. Furthermore, the profile selector 184 is deployed as part of the VMM 172. For this implementation, the profile selector 184 may be adapted to provision the UI framework component 186 within the VM 170₁ and perhaps UI framework components within other VMs (e.g., VM 170_M).

III. Operation Flow of the UI Control Logic

Figure 3A:
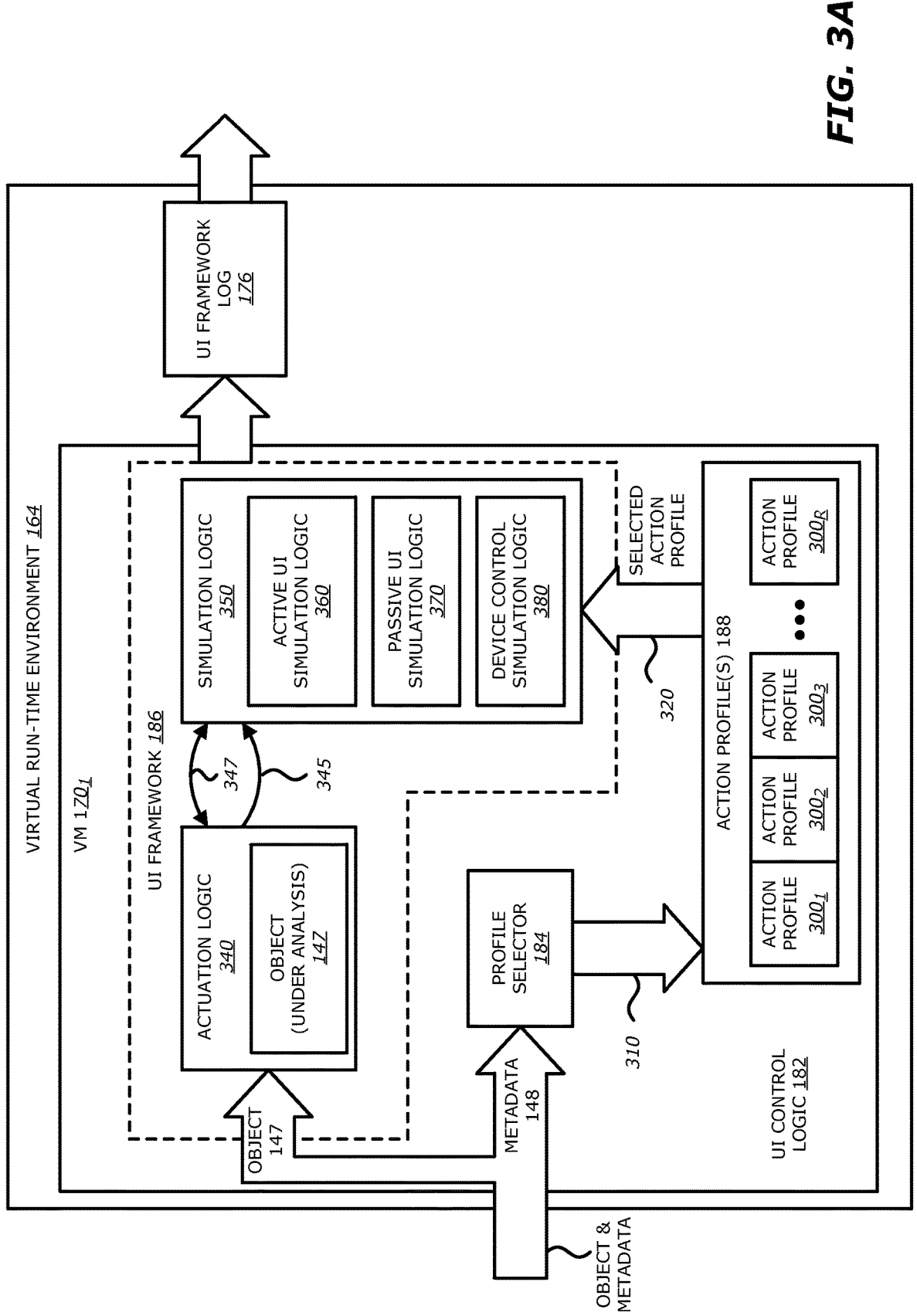
FIG. 3A is an exemplary block diagram of a first operational flow for the UI control logic operating within the virtual run-time environment.
Figure 3B:
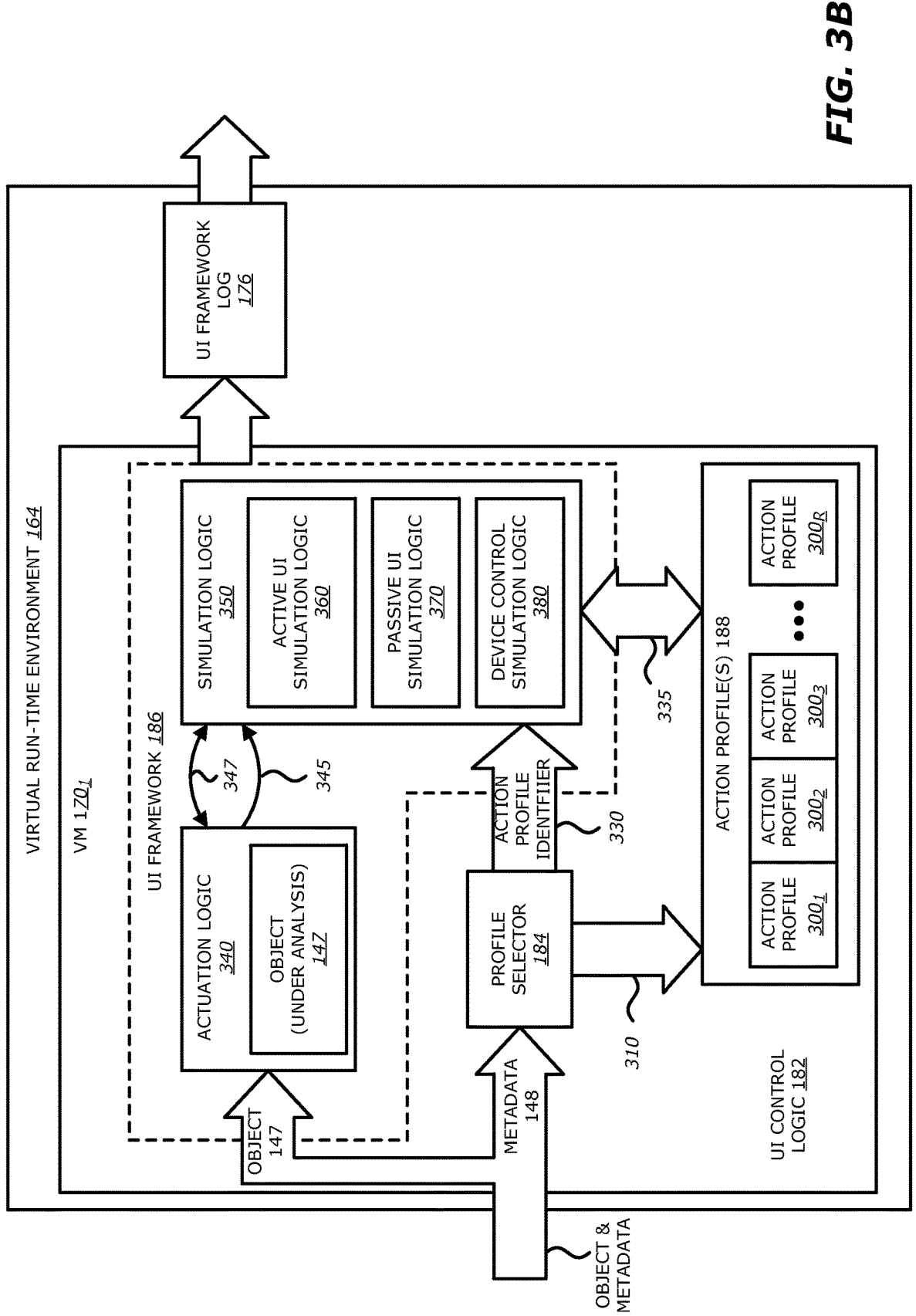
FIG. 3B is an exemplary block diagram of a second operational flow for the UI control logic operating within the virtual run-time environment.

Referring to FIGS. 3A and 3B, exemplary block diagrams of operational flows for the UI control logic 182 within the virtual run-time environment 164 is shown. In particular, one embodiment of the UI control logic 182 operating within the VM 170₁ is illustrated. Herein, the UI control logic 182 comprises (1) the profile selector 184 and (2) the UI framework 186. As shown, the UI framework 186 comprises (a) actuation logic 340 and (b) simulation logic 350, which includes (i) active UI simulation logic 360; (ii) passive UI simulation logic 370; and (iii) device control simulation logic 380.

According to one embodiment of the disclosure, the object 147 and metadata 148 are provided to the VM 170₁. Based on the metadata 148, the profile selector 184 selects an action profile (herein the "selected action profile" 300₁) within the action profile(s) 188, namely a plurality of action profiles 300₁-300_R (R≥2) that may be hosted in the VM 170₁ (as shown) or outside the VM 170₁ within the virtual run-time environment. This selection may be based, at least in part, on metadata identifying the object type. Of course, it is contemplated that, besides object type, other metadata may be used by the profile selector 184 to better identify the object 147 in order to choose the selected action profile 300₁ best suited for the particular object under analysis. Examples of other metadata that may be used include, but are not limited or restricted to the following: (i) data identifying whether the object 147 is encrypted and/or its type of encryption scheme, (ii) data identifying whether the object 147 is or contains an embedded object, (iii) data identifying whether the object 147 includes password-protected fields and information associated with the password; (iv) data identifying the type of application needed for processing the object 147, and/or (v) data identifying the transmission protocol used in delivery of network content including the object 147.

Herein, according to one embodiment of the disclosure, each "action profile" is a collection of instructions and/or commands that performs UI functionality in accordance with a set of rules prescribed for that action profile. As a result, the selected action profile 300₁ is configured for use in controlling UI functionality during analysis of the object 147. For instance, where the object 147 is identified as a Microsoft® Excel® spreadsheet, the selected action profile 300₁ may conduct different UI functions (e.g., select tabs, add text to certain cells, scroll down a certain number of cell rows, etc.) than another action profile 300_R for controlling UI functionality during analysis of a PDF document (e.g., scroll pages of the document, etc.).

According to a first embodiment, as shown in FIG. 3A, upon selection of the action profile, the profile selector 184 provides signaling 310 to identify the selected action profile 300₁ that is part of the pre-stored action profile(s) 188. In response, according to one embodiment of the disclosure, the content 320 of the selected action profile 300₁ may be passed to the simulation logic 350 for use by the active UI simulation logic 360, the passive UI simulation logic 370, and the device control simulation logic 380. According to another embodiment of the disclosure, as shown in FIG. 3B, upon choosing the selected action profile 300₁, the profile selector 184 passes an identifier 330 of the selected action profile 300₁ to the simulation logic 350 (active UI simulation logic 360, passive UI simulation logic 370, and device control simulation logic 380) to allow the simulation logic 350 to poll and retrieve information 335 (e.g., commands, instructions, rules and/or parameters) from the selected action profile 300₁.

As an optional feature, although not shown, addressing information (e.g., a pointer, memory storage location, etc.) may be provided to the actuation logic 340 associated with that particular object type. The addressing information may be used for accessing a sequence of commands and/or instructions that conducting operations suitable for launching a particular object type.

Referring to both FIGS. 3A and 3B, implemented as part of a software profile that provisions the VM 170₁, the actuation logic 340 is responsible for launching the object 147. The particular implementation of the actuation logic 340 may vary depending on the object type. For instance, where the object 147 is a document type (e.g., Microsoft® Word® document, PDF document, etc.), the actuation logic 340 may be customized logic which supports launching (in this case, opening) of the object 147 (or concurrent launching of the object 147 by different versions of) the application and/or OS (e.g., Windows® 7 and Office® 2013; Windows® 7, Office® 2010, etc.). Alternatively, where the object 147 is an executable, the actuation logic 340 may be a software module (e.g., script, etc.) that copies the object 147 to a file system storage location and subsequently calls an operating system (OS) function, such as "CreateProcess( )" for example, to process the object 147.

Upon launching the object 147, the actuation logic 340 provides a launch notification 345 to the simulation logic 350, namely the active UI simulation logic 360, the passive UI simulation logic 370 and the device control simulation logic 380. According to one embodiment, the launch notification 345 may cause the simulation logic 350 to poll for data 347. According to one embodiment of the disclosure, the data 347 may include (i) an identifier for the object 147; (ii) an identifier as to a type of actuation logic (e.g., particular software module) used to launch the object 147; and/or (iii) the time that the object 147 was launched. Of course, in accordance with a "push" communication scheme, the data 347 may be provided as part of the launch notification 345.

Figure 4A:
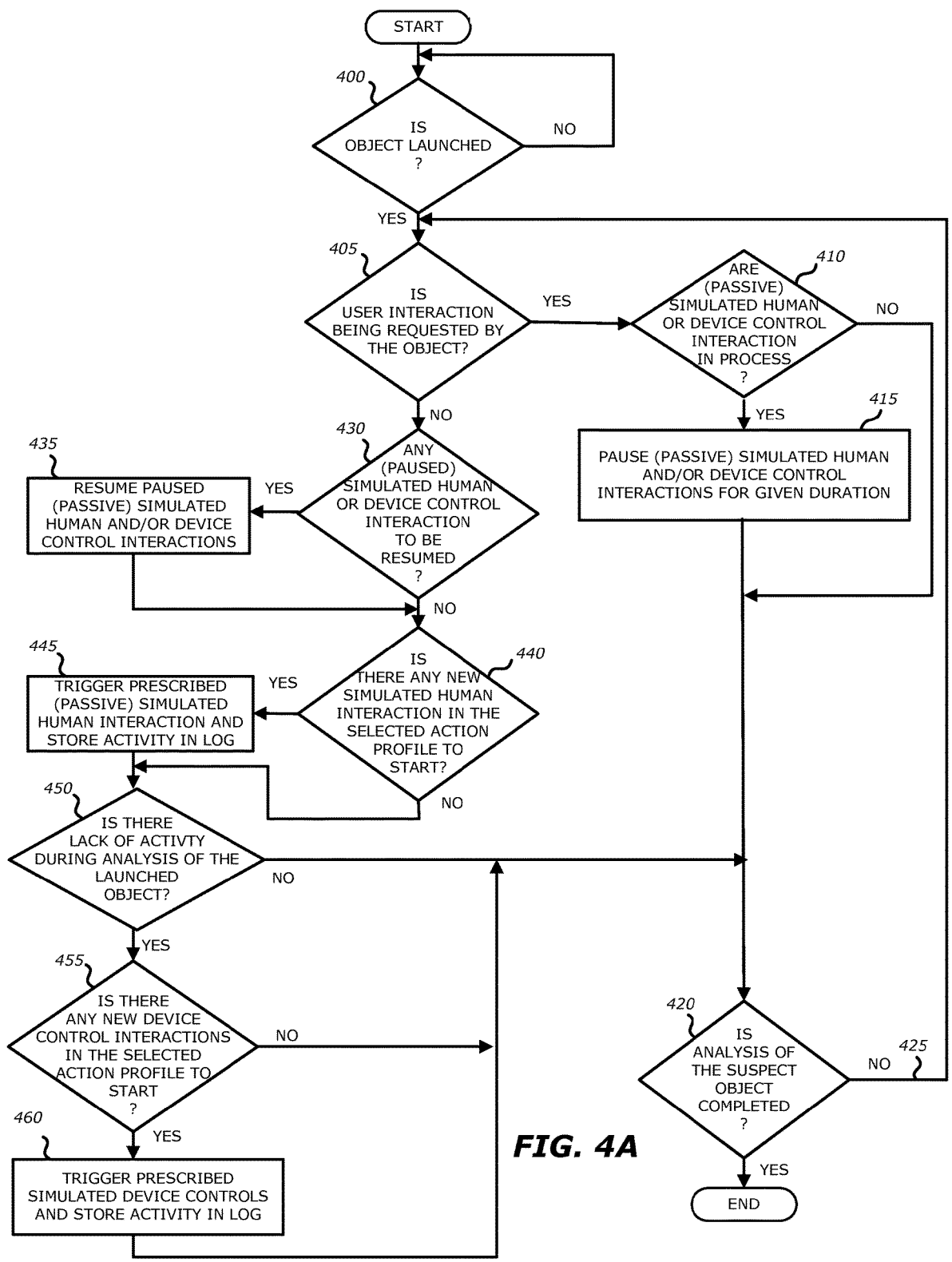
FIG. 4A is a flowchart illustrating an exemplary process conducted by passive UI simulation logic and device control simulation logic that are operating in accordance with a selected action profile and are conducting simulated user interactions to increase the likelihood in accurately detecting a malicious object.

According to this embodiment, the identifier of the object 147 and/or the identifier of the actuation logic 340 may be used to verify that the correct selected action profile 300₁ has been passed to the simulation logic 350 for use at the correct time(s) during processing of the object 147. The launch time may be used to synchronize the active UI simulation logic 360, the passive UI simulation logic 370 and the device control simulation logic 380 with each other. The launch time also establishes a reference time for use when the passive UI simulation logic 370 is conducting time-based simulated human, and/or the device control simulation logic 380 is conducting time-based simulated device control interaction in accordance with the selected action profile 300₁. The synchronization is especially relevant for actions conducted by the passive UI simulation logic 370 and the device control simulation logic 380 in accordance with the selected action profile 300₁, as illustrated in FIG. 4A, and adds intelligence and predictability to the user interaction. Therefore, it is contemplated that most or all of the UI simulation logic 360/370/380 is in communication with the same (or synchronized) timing circuitry (e.g., real time clock, counter, etc.).

As further shown in FIG. 3A and FIG. 3B, the active UI simulation logic 360, the passive UI simulation logic 370 and the device control simulation logic 380 are instantiated with or are instantiated to access content within the selected action profile 300₁, which controls the simulated human and device control interactions conducted by the UI framework 186 during analysis of the object 147. Collectively, in accordance with the rules outlined in the selected action profile 300₁, the simulation logic 350 conducts particular actions (e.g., expected user interface interactions and/or methods of activation) during particular operating states at which such actions are expected (e.g., in predetermined sequence (order) and/or at or within a predetermined period of time). Furthermore, although described as being conducted in sequentially, it is contemplated that two or more actions may be conducted concurrently (at least partially overlapping at the same time).

Operating as part the UI framework 186, the active UI simulation logic 360 is a first type of simulated user interaction which is configured to detect input requests (e.g., password request, an attempt to display a dialog or text box for selection of a radio button or text input, etc.) initiated by the object 147 that require "active" human interaction. In response, based on the contents of the selected action profile 300₁, the active UI simulation logic 360 determines whether to provide a response and, where appropriate, the type of response that simulates the requested human interaction. For instance, the selected action profile 300₁ may cause the active UI simulation logic 360 to provide signaling that simulates human interaction responsive to the input request initiated by the launched object 147. For example, the signaling may simulate the user closing a dialog box that requires dismissal before continuing or simulate the user selecting a particular radio button that closes the dialog box and opens another dialog box for handling. Such signaling may be intentionally delayed by a prescribed or random period of time to further simulate human interaction. This response and/or responses to subsequent input requests may trigger the object 147 to commence a malicious attack, which could only have been activated by such simulated human interactions.

The passive UI simulation logic 370 is a second type of simulated user interaction which provides "passive" simulated human interaction. The "passive" simulated human interaction is in accordance with the selected action profile, but it is not responsive to an input request by the launched object 147 (e.g., a behavior of the launched object that requiring user action). In some cases, the simulated human interaction is in response to a prescribed level of inactivity by the object.

Herein, the "passive" simulated human interaction may include any simulated operations that, without prompting, may be conducted by the user on the object such as moving to a particular page in a Microsoft® Office Word document (object) or switching to a particular tab in a Microsoft® Office Excel document (object). As an illustrative example, assuming the object has an object-type of a Microsoft® Office Excel document, experiential knowledge of typical placement of exploit/malicious code (e.g., through machine learning techniques) in a Microsoft® Office Excel document may result in instructions in the selected action profile for the passive UI simulation logic 370 to switch to the second sheet of the Microsoft® Office® Excel document at a predetermined time after the actuation logic launches the object.

The device control simulation logic 380 is a third type of simulated user interaction that may be performed during virtual analysis of the suspect object 147. The device control simulation logic 380 simulates device control interactions that are object-type agnostic. For example, the device control simulation logic 380 may receive instructions from the selected action profile 300₁ to simulate certain device control interactions, such as simulate particular keystrokes and/or particular mouse movements, in an attempt to detonate a malicious object that is awaiting user interaction before conducting a malicious attack.

Additionally, the UI framework log 176 records the activities conducted by the simulation logic 350. As discussed above, the UI framework log 176 may record any suspicious activity and/or malicious activity as well as any actions taken, or refrained from being taken, any requested input and timestamps for all actions and requested input. Upon completion of the dynamic analysis, the information recorded in the UI framework log 176 may be accessible to the score determination logic 168 and/or the classification engine 190.

It is contemplated that the action profile(s) 188 may be updated through a configuration file that may be propagated to the MDS 110₁ over a network 125 of FIG. 2. For example, the action profile update may be provided by the management system 220 over network 125 via machine learning engine 122, which receives information associated with malicious objects as reported by reporting engine 195 based on content within the UI framework log 176. Additionally, the machine learning engine 122 receives information associated with UI-dependent malicious objects as reported by other MDSes (e.g., MDS 110₂ or MDS 110₃). The machine learning engine 122 utilizes this information, and information from third party sources, to develop action profile updates. The action profile update may include revised rules, new instructions or commands, and/or altered parameters that may provide improved malware detection by targeting new characteristics in an object-type and/or targeting newly identified malware inclusive of exploits, suspicious code and/or malicious code or other data that assists in conducting a malicious attack on a network or network device.

Alternatively, the action profile update may be provided by over the network 105 (for example through a download using the cloud computing services 228 and/or manual installation through the use of a storage device such as flash storage).

IV. User Interaction Conducted by the Simulation Logic

Referring now to FIG. 4A, a flowchart illustrating an exemplary method conducted by the passive UI simulation logic and the device control simulation logic for detecting malware is shown. Each block illustrated in FIG. 4A represents an operation performed in accordance with a selected action profile for providing targeted, simulated user interaction during analysis of the object 147 within a virtual run-time environment. These operations are conducted by the MDS 1001 in efforts to automatically, without human interaction, detect malicious objects that commence a malicious attack in response to human interaction. For this embodiment, with the selected active profile, "active" simulated human interaction responsive to input requests from the object is assigned the highest priority, while "passive" simulated human interactions and simulated device control interactions are assigned lesser priority.

Herein, a first determination is made as to whether the object has been launched by the actuation logic (block 400). If not, the UI framework does not receive a launch notification from the actuation logic, and thus, the simulation logic remains in an idle state. However, once an object is launched, the simulation logic receives a launch notification from the actuation logic, which causes the simulation logic to reference the selected action profile. A first determination is made as to whether user interaction is currently being requested based on resultant behaviors of the object during analysis (block 405). Stated differently, a determination is made as to whether the object process has initiated an input request, where timely "active" simulated human interaction is necessary. This determination may be conducted by monitoring system calls and other signaling that is directed to generation of a dialog box, text box, window or other perceivable element that would require user interaction.

In event that the passive UI simulation logic is currently conducting "passive" simulated human interactions and/or the device control simulation logic is currently conducting simulated device control interactions in accordance with rules outlined in the selected action profile, these simulated operations are paused for a prescribed duration. The prescribed duration may be set by the rules set forth in the selected action profile that identify the amount of time necessary to complete a particular type of "active" simulated human interaction. Furthermore, the "paused" simulated operations are time-stamped and placed in a wait queue for subsequent processing after the active UI simulation logic has completed its simulated human interaction. The selected action profile triggers the active UI simulation logic to conduct a particular "active" simulated human interaction and store the activity in the UI framework log. Thereafter, the simulation logic determines if the analysis of the object has completed, and if not, cycles back to determine whether the object is actively requesting user interaction (blocks 410-425).

In the event that active user interaction is not needed at this time, a determination is made as to whether there are any "paused" passive simulated human interactions and/or simulated device control interactions (blocks 405 and 430). This determination may be accomplished by analysis of the wait queue and/or determining whether a prescribed wait duration has elapsed (e.g., difference between current time and the time-stamp is greater than or equal to the prescribed duration). If so, these paused simulated operations are resumed (block 435). However, if there are no paused passive simulated human interactions and/or the simulated device control interactions, a determination is made as to whether there are any "passive" simulated human interactions that, according to the selected action profile, should be initiated (block 440). If so, the selected action profile triggers the passive UI simulation logic to conduct a particular "passive" simulated human interaction and store the activity in the UI framework log (block 445).

In the event that there has been at least a predetermined level of UI simulated activity thus far, the simulation logic may return to determine if the analysis of the object has completed, and if not, cycles back to determine whether the object is actively requesting certain user interaction (blocks 450, 420 and 405). The prescribed level of UI simulated activity may be measured by a variety of ways. For instance, the prescribed level of UI simulated activity may be determined based on whether simulated human interactions have occurred for a certain percentage of the run-time since the object was launched. Alternatively, the process may determine the number of "active" simulated human interactions or the number of active/passive simulated human interactions that have been completed since the object was launched.

In the event that the predetermined level of UI simulated activity has not been met, the device control simulation logic accesses the selected action profile to determine what simulated device control interactions are requested by the selection action profile, and thereafter, the selected action profile triggers the device control simulation logic to simulate such device controls and store such activity in the UI framework log. Thereafter, the simulation logic returns to determine if the analysis of the object has completed, and if not, cycles back to determine whether the object is actively requesting user interaction (blocks 450, 420 and 405).

According to these operations, the UI control logic is adapted to prioritize "active" simulated human interaction above "passive" simulated human interaction and the simulated device control interaction. Hence, in some cases as described herein, simulated human interaction and simulated device control interactions may be temporarily halted to direct resources to respond to an activity initiated by the object. Of course, it is contemplated that some types of "passive" simulated human interactions and simulated device control interactions may continue despite detection of an input request by the object. This may be done to maintain perceived consistency in simulated operations to avoid sophisticated malware to detect abnormally prompt changes in operation.

Figure 4B:
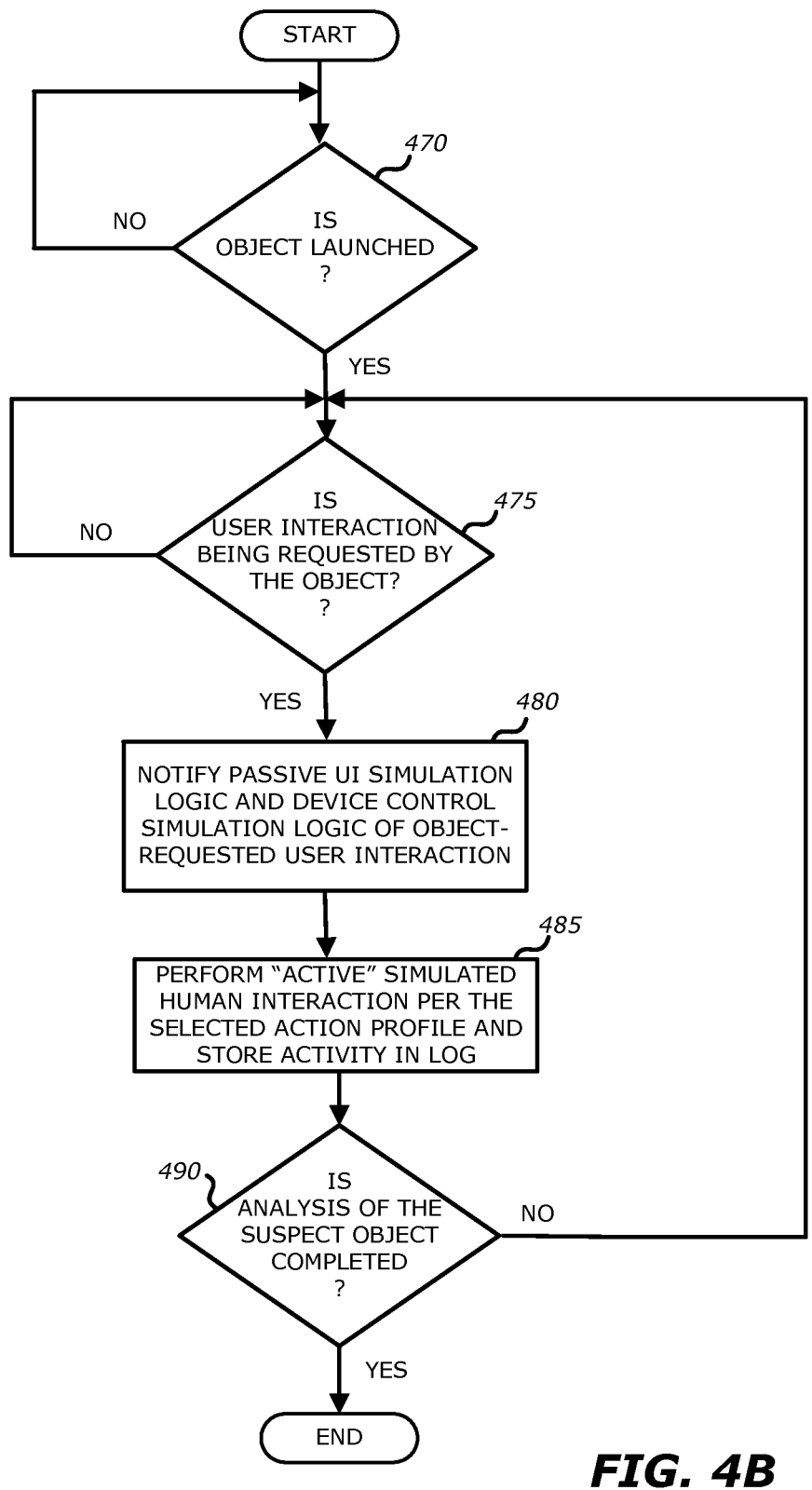
FIG. 4B is a flowchart illustrating an exemplary process conducted by the active UI simulation logic that is operating in accordance with the selected action profile and is conducting simulated user interactions to increase the likelihood in accurately detecting a malicious object.

Referring now to FIG. 4B, a flowchart illustrating an exemplary method conducted by the active UI simulation logic for detecting malware is shown. As previously described, a first determination is made as to whether the object has been launched by the actuation logic (block 470). If not, the active UI simulation logic remains in an idle state. However, once an object is launched, the active UI simulation logic receives a notification from the actuation logic, where the simulation logic determines whether the suspect object is currently requesting some sort of active user interaction such as a dialog box is opened that required dismissal before the object continues its operation for example (block 475).

If so, the active UI simulation logic notifies the passive UI simulation and the device control simulation logic of an imminent active user interaction (block 480). This notification prompts the passive UI simulation and the device control simulation logic to pause any current operations as described in FIG. 4A. Thereafter, the active UI simulation logic performs a human simulation operation in accordance with rules set forth in the selected action profile and such activity is stored in the UI framework logic (block 485).

If the active UI simulation logic determines that the suspect object under analysis is not currently requesting active user interaction or responsive simulated human interactions have been provided, the active UI simulation logic determines whether the analysis of the suspect object has completed. If not, the active UI simulation logic initiates another iterative cycle awaiting a requested user interaction (block 490).

V. Software Deployment of the MDS

Figure 5:
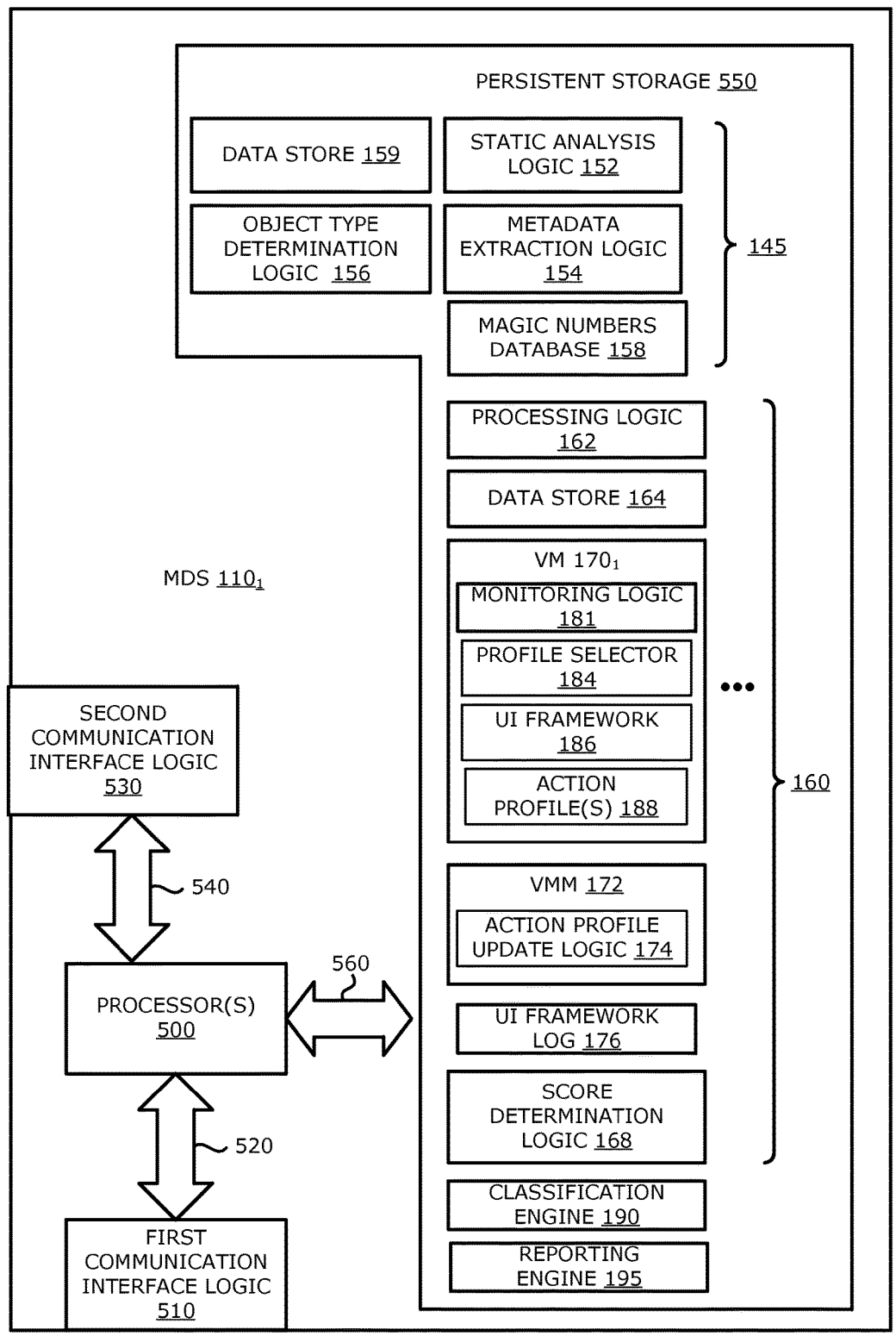
FIG. 5 is an exemplary block diagram of the logical architecture associated with the MDS of FIG. 1.

Referring now to FIG. 5, an exemplary block diagram of logic associated with the MDS 110$_1$ of FIG. 1 is shown. The MDS 110$_1$ comprises one or more processors 500 (hereinafter "processor(s)"), which is coupled to a first communication interface logic 510 via a first transmission medium 520. The first communication interface logic 510 may provide a communicative coupling with the network interface 136 of FIG. 1. Additionally, the processor(s) 500 may be communicatively coupled to a second communication interface logic 530 via a second transmission medium 540, which may provide communications with other MDSes 110₂-110₃ and management system 120 of FIG. 1.

According to one embodiment of the disclosure, the first communication interface logic 510 and/or the second communication interface logic 530 may be implemented as a physical interface including one or more ports for wired connectors. Additionally, or in the alternative, the first communication interface logic 510 and/or the second communication interface logic 530 may be implemented with one or more radio units for supporting wireless communications with other network devices.

The processor(s) 500 are further coupled to the persistent storage 550 via the transmission medium 560. According to one embodiment of the disclosure, the persistent storage 550 may be configured to store software components associated with the static analysis engine 145, the dynamic analysis engine 160, the classification engine 190 and the reporting engine 195. As shown, software components associated with the static analysis engine 145 may include the static analysis logic 152, the metadata extraction logic 154 and/or the object-type determination logic 156. The persistent storage 550 may be further configured to store software components associated with the dynamic analysis engine 160, which includes the VMM 172 along with the VMs $170_1$-$170_M$. All or some of the VMs $170_1$-$170_M$ may be provisioned with the UI control logic 182, which may include the profile selector 184, UI framework 186 and/or action profile(s) 188.

Additionally, the persistent storage 550 may include the magic number database 158 that is accessed by the object-type determination logic 156 (described above) and data stores 159 and 164 that may operate, at least part, as data buffers.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory computer readable storage medium having stored thereon logic that, upon execution by one or more processors implemented within a network device, performs operations comprising:
    launching, by an actuation logic, an object within a virtual run-time environment;
    selecting, by a control logic, an action profile based on metadata associated with the object, the metadata includes data identifying an object type corresponding to the object launched by the actuation logic and the action profile includes a collection of instructions or commands that performs one or more simulated user interactions in accordance with a set of rules prescribed for the action profile,
    wherein the one or more simulated user interactions include (i) a first simulated interaction, conducted by an active simulated logic that operates in accordance with the selected action profile, to perform a simulated action in response to an event initiated by the object and (ii) a second simulated interaction, conducted by a passive simulated logic that operates in accordance with the selected profile, to perform a simulated action normally performed by a user during activation of the object and not responsive to a particular behavior by the object.

2. The non-transitory computer readable storage medium of claim 1, wherein the launching of the object further comprises selecting the actuation logic being a software component implemented as part of the software profile that provisions one or more virtual machines operating within the virtual run-time environment, based on the metadata.

3. The non-transitory computer readable storage medium of claim 1, wherein the first simulated interaction comprises a simulated action that is responsive to a behavior by the object having been launched by the actuation logic in the one or more virtual machines, the behavior represents an operating state of the object where the object is actively waiting for user input.

4. The non-transitory computer readable storage medium of claim 3, wherein the first simulated interaction comprises at least one of (i) a simulated action of closing a window or a dialog box, (ii) a simulated action of selecting a particular radio button, or (iii) a simulated action of entering one or more characters into a text box.

5. The non-transitory computer readable storage medium of claim 3, wherein the second simulated interaction comprises a simulated action that is initiated by a user during virtual analysis of the launched object.

6. The non-transitory computer readable storage medium of claim 5, wherein the second simulated interaction comprises at least one of (i) a simulated action of scrolling a page of a document corresponding to the object, (ii) a simulated action of selecting a certain tab of a spreadsheet corresponding to the object, (iii) a simulated action of selecting a particular page of the document, or (iv) a simulated action of accessing one or more menu options.

7. The non-transitory computer readable storage medium of claim 3, wherein the second simulated interaction comprises simulated device control for an input device that controls operations of an endpoint targeted to receive data including the object.

8. The non-transitory computer readable storage medium of claim 7, wherein the simulated device control comprises at least one of (i) a simulated action of a keystroke for a keyboard corresponding to the input device, (ii) a simulated action of a movement of a mouse corresponding to the input device, (iii) a simulated action of a click of a button on the mouse, or (iv) a simulated action of an area of a touch screen corresponding to the input device.

9. The non-transitory computer readable storage medium of claim 1, wherein the first simulated interaction is controlled by a first user interaction (UI) simulation logic and the second simulated interaction is controlled by a second UI simulation logic, the second UI simulation logic is aware of the first simulated interaction being performed by the first UI simulation logic and pauses the second simulated interaction in favor of the first simulated interaction for later resumption of the second simulated interaction.

10. The non-transitory computer readable storage medium of claim 1 further comprising:
    prior to launching the object within the virtual run-time environment, selecting an action profile by a profile selector based on the received metadata associated with the object, the action profile comprises a plurality of rules that dynamically control the one or more simulated user interactions.

11. The non-transitory computer readable storage medium of claim 10, wherein the action profile is selected by the profile selector provisioned within one or more virtual machines operating within the virtual run-time environment.

12. The non-transitory computer readable storage medium of claim 10, wherein the action profile is selected by the profile selector implemented within a virtual machine monitor (VMM) communicatively coupled to one or more virtual machines operating within the virtual run-time environment.

13. An apparatus for detecting malware with an object, the apparatus comprising:
one or more action profiles, each action profile of the one or more action profiles being a collection of instructions or commands that performs user interaction (UI) activity in accordance with a set of rules prescribed for the corresponding action profile;
a profile selector for selecting an action profile from the one or more action profiles based on metadata associated with the object, the metadata includes data identifying a type of the object; and
a UI framework logic that, in response to the object being launched within a virtual machine, performs one or more simulated user interactions with the object in accordance with the set of rules prescribed in the selected action profile, the UI framework logic including (i) an actuation logic to launch the object, and (ii) simulation logic to control the simulated user interactions conducted on the launched object,
wherein the one or more simulated user interactions include a first simulated interaction conducted by the simulated logic that operates in accordance with the selected action profile to perform a first simulated action in response to an event initiated by the object and a second simulated interaction conducted by the simulated logic that operates in accordance with the selected profile to perform a second simulated action normally performed by a user during activation of the object and not responsive to a particular behavior by the object.

14. The apparatus of claim 13, wherein the simulation logic comprises at least (i) an active UI simulation logic configured to perform the first simulated action, (ii) a passive UI simulation logic configured to perform the second simulated action.

15. The apparatus of claim 14, wherein the active UI simulation logic is configured to:
detect an input request initiated by the launched object, and
responsive to detecting the input request initiated by the launched object, determine a response based on contents of the selected action profile.

16. The apparatus of claim 15, wherein the input request includes an attempted display of a dialog box.

17. The apparatus of claim 16, wherein the response comprises at least one of (i) a simulated action of closing the dialog box, or (ii) a simulated action of selecting a particular radio button associated with the dialog box.

18. The apparatus of claim 14, wherein the passive UI simulation logic is configured to provide a simulated interaction during virtual analysis of the launched object, the simulated interaction represents user-initiated simulated actions.

19. The apparatus of claim 14, wherein the simulation logic comprises a device control simulation logic, the device control simulation logic being configured to simulate device control interactions that are object-type agnostic.

20. The apparatus of claim 13 further comprising a log including data so that, when the launched object is classified as malware, the data is used to update the one or more action profiles by indicating a set of simulated user interactions that lead to successful triggering of malicious behavior by the launched object.

21. The apparatus of claim 13 further comprising logic to transmit the data within the log to a cloud infrastructure when the launched object is classified as suspicious as a result of virtual analysis, wherein the one or more action profiles are updated based on a lack of detonation of malware within the launched object or an obstruction of the detonation of malware within the launched object.

22. A computerized method implemented with a network device for detecting malware, comprising:
launching, by an actuation logic within the network device, an object within a virtual run-time environment; and
selecting, by a profile selector, an action profile based on metadata associated with the object, wherein the metadata comprises data identifying an object type corresponding to the object and the action profile comprises a set of rules that control one or more simulated user interactions with the launched object,
wherein the one or more simulated user interactions include a first simulated interaction conducted by an active simulated logic that operates in accordance with the selected action profile to perform a simulated action in response to an event initiated by the object and a second simulated interaction conducted by a passive simulated logic that operates in accordance with the selected profile to perform a simulated action normally performed by a user during activation of the object and not responsive to a particular behavior by the object.

23. The method of claim 22, wherein the launching of the object further comprises selecting the actuation logic based on the metadata.

24. The method of claim 22, wherein the first simulated interaction comprises a simulated action that is responsive to a behavior by the launched object in one or more virtual machines that are part of the run-time virtual environment, the behavior represents an operating state of the launched object where the launched object is actively waiting for user input.

25. The method of claim 22, wherein the second simulated interaction comprises a simulated action that is initiated by a user during virtual analysis of the launched object.

26. The method of claim 22, wherein the second simulated interaction comprises simulated device control for an input device that controls operations of an endpoint targeted to receive data including the object.

27. The method of claim 22, wherein the first simulated interaction is controlled by a first user interaction (UI) simulation logic and the second simulated interaction is controlled by a second UI simulation logic, the second UI simulation logic is aware of the first simulated interaction being performed by the first UI simulation logic and pauses the second simulated interaction in favor of the first simulated interaction for later resumption of the second simulated interaction.

28. The method of claim 22, wherein the action profile is selected from a plurality of action profiles by the profile selector provisioned within one or more virtual machines operating within the virtual run-time environment.

29. The method of claim 28, wherein the plurality of action profiles are updated via network delivered updates to modify instructions, parameters or rules within an action profile to be updated.

30. The method of claim 22, wherein the action profile is selected from a plurality of action profiles by the profile selector implemented within a virtual machine monitor (VMM) communicatively coupled to one or more virtual machines operating within the virtual run-time environment.

31. The method of claim 22 further comprising:
recording, in a log, selection of the action profile, determination of the first user interaction requested by the object, triggering of the first simulated interaction, and triggering of the second simulated interaction.

32. The method of claim 31, wherein data stored within the log is subsequently used to update a plurality of action profiles including the selected action profile by indicating whether certain simulated user interactions detonated malware within the object.

* * * * *